United States Patent [19]

Diermeier et al.

[11] Patent Number: 4,914,968
[45] Date of Patent: Apr. 10, 1990

[54] OIL SUPPLY ARRANGEMENT FOR GEAR-SHIFT MECHANISM

[75] Inventors: Fritz Diermeier, Munich; Johann Eichinger, Vaterstetten; Max Bartl, Munich, all of Fed. Rep. of Germany

[73] Assignee: Carl Hurth Maschinen-und Zahnradfabrik GmbH & Co., Munich, Fed. Rep. of Germany

[21] Appl. No.: 391,661

[22] Filed: Aug. 8, 1989

Related U.S. Application Data

[63] Continuation of Ser. No. 169,938, Mar. 18, 1988, abandoned.

[30] Foreign Application Priority Data

Mar. 24, 1987 [DE] Fed. Rep. of Germany ....... 3709626

[51] Int. Cl.⁴ ............................................. F16H 57/04
[52] U.S. Cl. ..................... 74/467; 184/6.24; 210/416.5
[58] Field of Search ................... 74/467; 184/6.24; 210/416.5

[56] References Cited

U.S. PATENT DOCUMENTS

| | | | |
|---|---|---|---|
| 1,429,466 | 9/1922 | Turnbull | 74/467 |
| 2,071,529 | 2/1937 | Howard | 184/6.24 |
| 2,801,006 | 7/1957 | Hultgren et al. | 184/6.24 |
| 4,352,301 | 10/1982 | Fleury | 74/467 |

FOREIGN PATENT DOCUMENTS

| | | | |
|---|---|---|---|
| 615875 | 7/1935 | Fed. Rep. of Germany | 184/6.24 |
| 1034923 | 11/1952 | Fed. Rep. of Germany | 184/6.24 |
| 698309 | 1/1931 | France | 184/6.24 |
| 1224632 | 6/1960 | France | 184/6.24 |
| 59-9361 | 1/1984 | Japan | 74/467 |
| 1270470 | 11/1986 | U.S.S.R. | 74/467 |

OTHER PUBLICATIONS

"Analyzing Hydraulic Systems", Parker Hannifin Bulletin #0222–B1, Sep. 1984, pp. 10-1 to 10-18.

*Primary Examiner*—Leslie A. Braun
*Assistant Examiner*—Scott Anchell
*Attorney, Agent, or Firm*—Flynn, Thiel, Boutell & Tanis

[57] ABSTRACT

A pump 11 is provided in a gear-shift mechanism, in particular a boat reversing gear transmission, in order to supply the hydraulically operated friction clutches with pressurized oil. The pump 11 sucks oil through a fine-mesh filter 19 out of the sump 21. The fine-mesh filter 19 is arranged in a separate filter chamber 12 which is connected through a suction pipe 13, 15 to the sump 21 and to the suction side of the pump 11. The two suction pipes are arranged in such a manner with respect to one another that the filter chamber 12 is always filled with oil. A dry running of the pump 11 during starting is avoided in this manner. The fine-mesh filter 19, in the form of a removable filter cartridge 20, allows the flow of oil from the inside thereof to the outside and is arranged for easy access from above.

7 Claims, 1 Drawing Sheet

4,914,968

OIL SUPPLY ARRANGEMENT FOR GEAR-SHIFT MECHANISM

This application is a continuation of U.S. Ser. No. 169,938, filed Mar. 18, 1988, abandoned.

FIELD OF THE INVENTION

The invention relates to a gear-shift mechanism or transmission and, in particular, a gear-shift mechanism for use on boats.

BACKGROUND OF THE INVENTION

Dirt in the oil, such as abrasions from the clutch disks, or other foreign objects, for example residues of molding sand or chips which had settled in areas of the housing difficult to reach, can result, in gear transmissions having hydraulically operated friction clutches, in a premature wear of functionally important parts like gaskets, gears, bearings or the pump. For this reason, a filter is often arranged in the oil circuit for keeping dirt away from the endangered gear parts. In particular, in the case of boat transmissions, however, difficulties result thereby. The known suction sieves in the sump are too coarse so as to be unable to keep the fine abrasion particles away from the gear part; the consequence is that foreign objects in the pump, which has a gap width of for example only 0.2 mm., produce grooves which very considerably reduce the efficiency of the pump. To put a fine-mesh filter in the place of a suction sieve often fails because of a lack of accessibility in the boat for the purpose of cleaning or exchanging the filter. Furthermore, a fine-mesh filter arranged in this manner makes sucking in of the oil through the pump more difficult during starting, in particular after long periods of nonuse when oil is no longer present in the pump and the oil must first overcome a certain suction level until it reaches the pump. As a result, the pump must run without lubrication for such period. A fine-mesh filter arranged on the pressure side does not offer any protection for the pump and, as a result, the pump continues to be subjected to the abrasion particles and other foreign objects.

Therefore, the basic purpose of the invention is to provide a transmission of the abovementioned type so that a 100% filtering of the oil which is being circulated is assured without influencing in any manner the functioning capability of the pump. Furthermore, a favorable accessibility of the filter mechanism exists.

The purpose is attained, with a transmission embodying the invention, an arrangement of the filter on the suction side, thus in front of the pump to provide protection against any foreign objects for all functionally important gear parts including the pump, and the arrangement of the filter in a separate filter chamber so as to create in connection with the disclosed arrangement of the suction pipes a siphon effect, which assures a safe suction during starting, even after a long period of nonuse.

BRIEF DESCRIPTION OF THE DRAWINGS

The invention will be described hereinbelow with reference to one exemplary embodiment illustrated in two figures, wherein.

DETAILED DESCRIPTION

Figure 1:
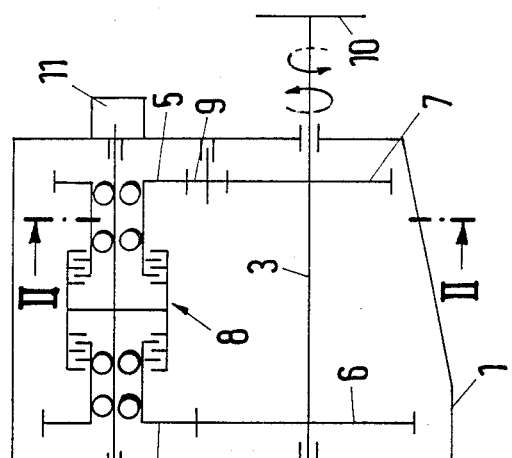
FIG. 1 is a schematic diagram of a gear transmission adapted to embody the invention.

FIG. 1 illustrates a much simplified reversing gear transmission in which the inventive filter arrangement is utilized. A drive shaft 2 and a driven shaft 3 with two gears 6, 7 are rotatably supported in a housing 1. Two gears 4, 5 are rotatably supported on the drive shaft 2, which gears can be selectively coupled by means of a hydraulically operated double-friction clutch 8 to the shaft 2. The gear 4 meshingly engages the gear 6 and the gear 5 meshingly engages an intermediate gear 9 also supported in the housing 1 on an intermediate shaft. The intermediate gear 9 also meshingly engages the gear 7. One end of the drive shaft 2 extends from the housing 1 and is connected to a motor (not illustrated). The other end of the shaft 2 drives a pump 11, which pump supplies the necessary pressurized oil to the double-friction clutch 8. A further shaft (not illustrated), for example a drive shaft or a propeller shaft, can be connected to a flange 10 provided on an end of the driven shaft 3 extending out of the housing 1.

Figure 2:
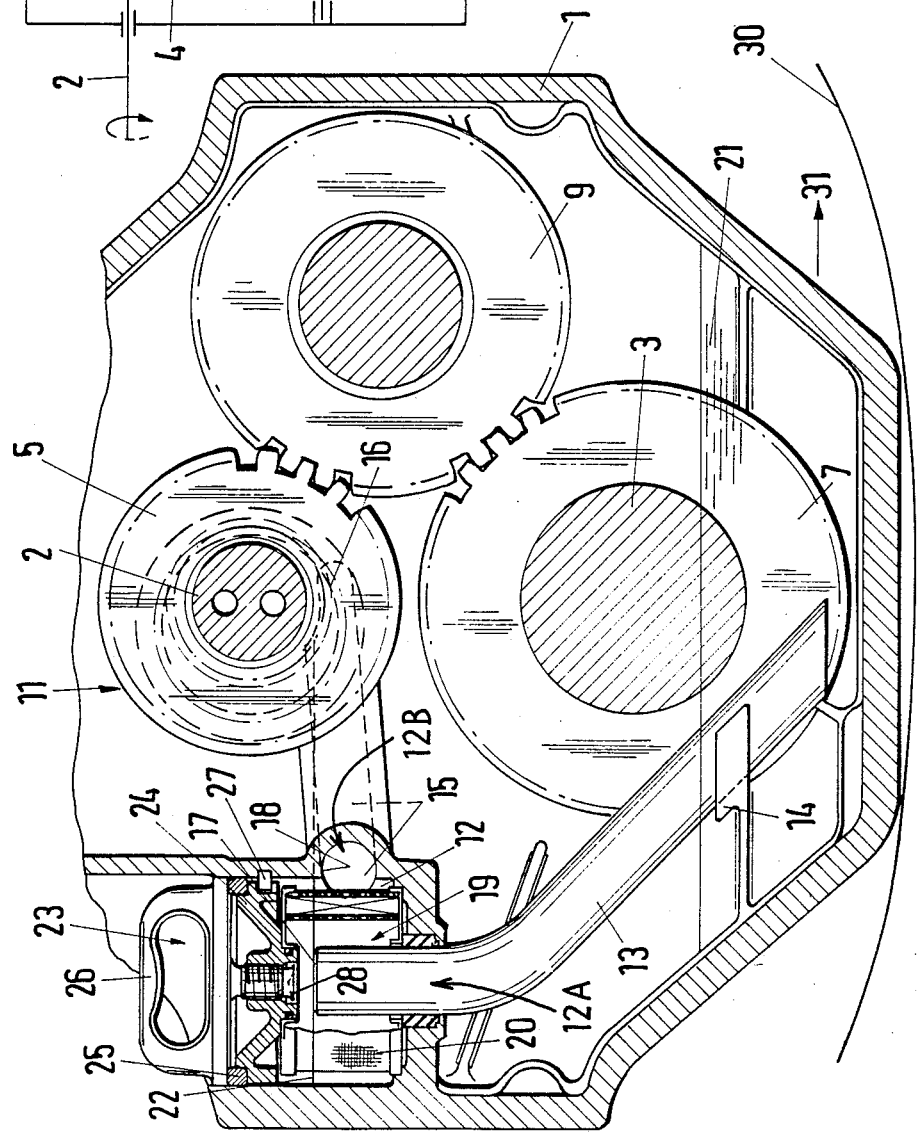
FIG. 2 is a sectional view taken along the line II—II of FIG. 1.

FIG. 2 illustrates in a slightly larger scale a cross-sectional view taken approximately along the line II—II of FIG. 1. A cuplike filter chamber 12 is cast into the housing 1 above a sump 21, approximately next to the drive shaft 2. A first suction pipe 13 extends into the filter chamber 12 from the bottom through an inlet port 12A and is appropriately sealed thereat. The pipe is secured to a rib 14 on the interior of the housing 1. A second suction pipe 15 is also cast into the housing 1 and extends from an outlet port 12B the filter chamber 12 to the area 16 of the pump 11, which area is on the suction side of the pump. A fine-mesh filter 19 forming a filter cartridge 20 is inserted into the filter chamber 12, such that the first suction pipe 13 extends into the interior of the filter cartridge 20. The filter cartridge 20 is a unitary member having metallic upper and lower end plates between which is secured filter mesh forming a cylinder or any other convenient shape. A hole is provided in the bottom plate to allow the pipe 13 to extend therethrough and into the interior of the cartridge 20.

The upper end 17 of the first suction pipe 13, that is the end 17 adjacent the filter, and consequently the oil level 22, lies slightly higher than the end 18 of the second suction pipe 15 which is adjacent the filter, and slightly higher than the suction side 16 of the pump 11. The filter chamber 12 together with the suction pipes 13, 15 forms thus a type of a sump which remains always filled with oil. The oil sucked in by the pump 11 moves from the sump 21 through the first suction pipe 13 into the inside of the filter cartridge 20, flows through the cartridge from inside to the outside with all dirt particles and foreign objects being thereby held inside the filter cartridge and moves in this manner into the filter chamber 12 and from there on through the second suction pipe 15 to the pump 11, from where it is fed to shifting mechanisms (not shown) to the cylinders of the double-friction clutch 8 and/or other devices (not illustrated), such as lubricating points, oil coolers or the like. Due to the fact that oil is always present in the filter chamber 12, namely, at least up to a level corresponding with the upper end 17 of the first suction pipe 13, oil is immediately available to the pump 11 for starting even after long periods of nonuse because the second suction pipe 15 remains, since it lies below the oil level 22, also filled with oil. It is thus not possible for the pump to suck in oil only above a specific suction level or run dry until then.

The fine-mesh filter 19 can be removed from the filter chamber 12 in an upward direction for servicing or for changing the filter cartridge 20. The filter chamber 12 is closed off at the top thereof with a two-part lid 23. The lid consists of a lock washer 24 having a central hub with an internally threaded hole therein. The lock washer 24 has an annular flange with a notch therein. The central hub extends into the metal housing of the filter cartridge 20. A screw having a handle 26 is threadly received in the internally threaded hole in the lock washer 24. An O-ring 25, which is arranged peripherally therebetween, is thereby pressed radially outwardly against the inner wall of the filter chamber 12 and holds the lid 23 in this manner. An underpressure of approximately 0.2 bar., which exists during the operation in the filter chamber 12, offers an additional safety against an inadvertinent removal of the lid 23. A nose 27 in the filter chamber 12 projects into a corresponding recess in the peripheral edge of the lock washer 24 to ease a screwing in of the screw on the handle 26. The latter can be connected to the lock washer 24 with a conventional safety lock 28, so that only a few rotations are needed to cancel the pressure of the O-ring 25 and to enable a removal of the screw with the lock washer 24 and O-ring 25 attached.

FIG. 2 shows the inner contour 30 of a boat hull under the housing 1. Reference numeral 31 indicates the direction, with which an initially mentioned known suction sieve or the like would have to be constructed. Aside from the fact that same is hardly accessible, a further disadvantage is that during a cleaning of the suction sieve or during a changing of a corresponding fine-mesh filter, first the oil must always be drained or sucked out: an operation, which boat drivers do not like to perform. In the inventive arrangement of the fine-mesh filter, same can be inspected and/or changed at any time without first draining or sucking the oil out of the transmission.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a gear-shift mechanism, an oil supply arrangement comprising a housing with plural gears therein and at least one hydraulically operated friction clutch adapted to be supplied with pressurized oil by a pump, said pump being arranged above a sump oriented at a bottom of said housing, from which sump oil is sucked by said pump, the improvement wherein:
    filter chamber means is provided on said housing for holding a designated quantity of oil separate from said sump, said filter chamber means being oriented above an oil level of oil within said sump, said filter chamber means having an oil inlet port means and an oil outlet port means, said oil inlet port means including a terminal end that is at an elevation higher than the elevation of said outlet port means, said outlet port means being connected through a first conduit means to a suction port on said pump;
    a hollow fine-mesh filter located in said filter chamber means, a second conduit means being supported in said housing and extending from an inlet end located beneath said oil level in said sump to said terminal end of said inlet port means, said oil outlet port means being located on an exterior side of said fine-mesh filter, said terminal end terminating inside said hollow fine-mesh filter at an elevation that is higher than the elevation of said outlet port means, said designated quantity of oil being oriented between said outlet port means and said terminal end so that said outlet port means will always be immersed in oil even after prolonged periods of inoperativeness of said pump; and
    access means on said housing for facilitating access to said fine-mesh filter without necessitating a removal of oil from said sump.

2. The gear-shift mechanism according to claim 1, wherein said fine-mesh filter means is designed as a hollow filter cartridge for facilitating easy removal and replacement.

3. The gear-shift mechanism according to claim 2, wherein said flow through said filter cartridge is from inside thereof to the outside.

4. A gear-shift mechanism according to claim 1, wherein said filter chamber means is arranged substantially laterally next to the gear shaft driving said pump.

5. A gear-shift mechanism according to claim 1, wherein said access means is on an upper surface of said housing so as to facilitate said fine-mesh filter being removed from said filter chamber means in an upward direction.

6. A gear-shift mechanism according to claim 1, wherein said friction clutch is part of a boat reversing gear transmission.

7. In a gear housing having plural gears therein, an oil supply arrangement for supplying pressurized oil by a pump, said pump being arranged above a sump oriented at a bottom of said housing from which sump oil is sucked by said pump, the improvement wherein:
    filter chamber means is provided on said housing for holding a designated quantity of oil separate from said sump, said filter chamber means being oriented above an oil level of oil within said sump, said filter chamber means having an oil inlet port means and an oil outlet port means, said oil inlet port means including a terminal end that is at an elevation higher than the elevation of said outlet port means, said outlet port means being connected through a first conduit means to a suction port on said pump;
    a hollow fine-mesh filter located in said filter chamber means, a second conduit means being supported in said housing and extending from an inlet end located beneath said oil level in said sump to said terminal end of said inlet port means, said oil outlet port means being located on an exterior side of said fine-mesh filter, said terminal end terminating inside said hollow fine-mesh filter at an elevation that is higher than the elevation of said outlet port means, said designated quantity of oil being oriented between said outlet port means and said terminal end so that said outlet port means will always be immersed in oil even after prolonged periods of inoperativeness of said pump; and
    access means on said housing for facilitating access to said fine-mesh filter without necessitating a removal of oil from said sump.

* * * * *